(12) United States Patent
Takeuchi et al.

(10) Patent No.: US 10,964,153 B2
(45) Date of Patent: Mar. 30, 2021

(54) SALES SYSTEM, SALES TERMINAL, USER TERMINAL, AND PROGRAM

(71) Applicant: JAPAN TOBACCO INC., Tokyo (JP)

(72) Inventors: Manabu Takeuchi, Tokyo (JP); Takuma Nakano, Tokyo (JP); Manabu Yamada, Tokyo (JP); Taiji Miyakawa, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 163 days.

(21) Appl. No.: 16/008,416

(22) Filed: Jun. 14, 2018

(65) Prior Publication Data

US 2018/0293831 A1   Oct. 11, 2018

Related U.S. Application Data

(63) Continuation of application No. PCT/JP2015/085114, filed on Dec. 15, 2015.

(51) Int. Cl.
*G07F 9/02* (2006.01)
*G06Q 20/18* (2012.01)
(Continued)

(52) U.S. Cl.
CPC ............ *G07F 9/023* (2013.01); *G05B 15/02* (2013.01); *G06Q 20/18* (2013.01); *G06Q 20/322* (2013.01);
(Continued)

(58) Field of Classification Search
CPC .... G07F 9/023; G06Q 30/06; G06Q 20/3278; G06Q 20/18; G06Q 20/322; G05B 15/02
(Continued)

(56) References Cited

U.S. PATENT DOCUMENTS 6,640,214 B1 * 10/2003 Nambudiri ........... G06Q 10/087
705/21
7,620,475 B1 * 11/2009 Bottazzi ............... G06Q 20/343
235/383
(Continued)

FOREIGN PATENT DOCUMENTS

JP    2002-109618 A    4/2002
JP    2002-149773 A    5/2002
(Continued)

OTHER PUBLICATIONS

International Search Report (PCT/ISA/210) issued in PCT/JP2015/085114, dated Mar. 22, 2016.
(Continued)

*Primary Examiner* — Michael Collins
(74) *Attorney, Agent, or Firm* — Birch, Stewart, Kolasch & Birch, LLP (57) ABSTRACT

Provided is a sales system, comprising a sales terminal and a user terminal. The user terminal further comprises a user-side storage unit which pre-stores desired merchandise identification information, and a user-side communication unit which, when the user terminal has entered a communication area wherein communication with the sales terminal is possible, transmits via near-field communication to the sales terminal the desired merchandise identification information which has been pre-stored in the user-side storage unit. The sales terminal further comprises a sales-side storage unit which stores merchandise identification information, which identifies each of a plurality of pieces of merchandise, in association with merchandise location information which indicates the location on a display shelf of each of the plurality of pieces of merchandise, and a sales-side control unit which, on the basis of the desired merchandise identification information, extracts from the sales-side storage unit desired merchandise location infor-
(Continued)

mation which is the merchandise location information which indicates the location on the display shelf of the desired merchandise.

8 Claims, 7 Drawing Sheets

(51) Int. Cl.
  *G06Q 20/32* (2012.01)
  *G05B 15/02* (2006.01)
  *G06Q 30/06* (2012.01)
(52) U.S. Cl.
  CPC ......... *G06Q 20/3278* (2013.01); *G06Q 30/06* (2013.01)
(58) Field of Classification Search
  USPC .................................................. 700/231–244
  See application file for complete search history.

(56) References Cited

U.S. PATENT DOCUMENTS

| | | | |
|---|---|---|---|
| 2008/0071421 A1* | 3/2008 | Silverbrook | H04L 9/3247 700/231 |
| 2010/0191369 A1* | 7/2010 | Kim | G07F 9/026 700/235 |
| 2012/0029691 A1* | 2/2012 | Mockus | H04W 4/06 700/232 |
| 2014/0094965 A1* | 4/2014 | Silverbrook | G06Q 10/087 700/237 |
| 2014/0316561 A1* | 10/2014 | Tkachenko | G07F 11/38 700/236 |
| 2014/0358705 A1* | 12/2014 | Harrington | G06Q 30/0623 705/16 |
| 2015/0100152 A1 | 4/2015 | Barragán Treviño et al. | |
| 2015/0100441 A1 | 4/2015 | Alarcon et al. | |
| 2018/0103778 A1* | 4/2018 | Olovsson | G06Q 10/08 |

FOREIGN PATENT DOCUMENTS

| | | |
|---|---|---|
| JP | 2004-118674 A | 4/2004 |
| JP | 2004-145477 A | 5/2004 |
| JP | 2006-146692 A | 6/2006 |
| JP | 2006-155668 A | 6/2006 |
| JP | 2006-236107 A | 9/2006 |
| JP | 2007-65781 A | 3/2007 |
| JP | 2008-217239 A | 9/2008 |
| JP | 2009-252152 A | 10/2009 |
| JP | 2010-170228 A | 8/2010 |
| JP | 2012-94070 A | 5/2012 |
| JP | 5130093 B2 | 1/2013 |
| JP | 5349870 B2 | 11/2013 |
| JP | 5364386 B2 | 12/2013 |
| JP | 5792412 B1 | 8/2015 |
| TW | 200721029 A | 6/2007 |
| WO | WO 2015/051376 A1 | 4/2015 |

OTHER PUBLICATIONS

Taiwanese Office Action issued in Application No. 105104727, dated Aug. 31, 2017.
Taiwanese Office Action issued in Application No. 105104727, dated Mar. 17, 2017.
English translation of the Japanese Office Action, dated Apr. 24, 2019, for Japanese Application No. 2017-555910.
English translation of the Russian Office Action, dated Apr. 3, 2019, for Russian Application No. 2018123721.
Extended European Search Report, dated Apr. 25, 2019, for European Application No. 15910695.4.
Japanese Office Action, dated Sep. 11, 2018, issued in corresponding Japanese Application No. 2017-555910, with English translation.
Japanese Office Action, dated Dec. 12, 2019, for Japanese Application No. 2017-555910, with an English translation.

* cited by examiner

SALES SYSTEM, SALES TERMINAL, USER TERMINAL, AND PROGRAM

TECHNICAL FIELD

The present invention relates to a sales system, a sales terminal, a user terminal, and a program for retrieving a desired product from products disposed on a display cabinet.

BACKGROUND ART

As a technique of selling products (a general cigarette, for example) over the counter (hereinafter, an over-the-counter sales method), there is known a technique of expressing, by a purchaser, to a shop clerk a product desired (hereinafter, a desired product) from among products disposed on a display cabinet, and retrieving, by the shop clerk, the desired product from the display cabinet.

Further, as a technique of expressing the desired product to a shop side, there is proposed a technology of notifying a sales terminal of the desired product, from a user terminal (an electronic cigarette package, a smartphone or the like having a communication function) carried by the purchaser (Patent Document 1, for example). Moreover, there is also proposed a technology of informing desired product position information indicating a position of the desired product on the display cabinet (Patent Documents 2 to 4, for example).

PRIOR ART DOCUMENT

Patent Document

Patent Document 1: WO2015/051376
Patent Document 2: U.S. Pat. No. 5,349,870
Patent Document 3: U.S. Pat. No. 5,130,093
Patent Document 4: U.S. Pat. No. 5,364,386

SUMMARY OF THE INVENTION

A first feature is summarized as a sales system comprising: a sales terminal arranged at a sales facility having a display cabinet on which products are disposed; and a user terminal carried by a user desiring to purchase a desired product included in the products, wherein the user terminal comprises: a user-side memory configured to previously store desired product identification information, the desired product identification information being product identification information identifying the desired product; and a user-side communication unit configured to transmit the desired product identification information previously stored in the user-side memory to the sales terminal by use of a short range radio communication, when the user terminal enters a communication area communicable with the sales terminal, the sales terminal comprises: a sales-side communication unit configured to receive the desired product identification information from the user terminal by use of the short range radio communication; a sales-side memory configured to store product identification information identifying each of the products and product position information indicating a position of each of the products on the display cabinet, in an associated manner; and a sales-side controller configured to extract, from the sales-side memory, desired product position information, based on the desired product identification information, the desired product position information being the product position information indicating a position of the desired product on the display cabinet.

A second feature according to the first feature is summarized as that the user-side communication unit transmits authentication information indicating that the user is qualified to purchase the desired product and the desired product identification information, to the sales terminal by use of the short range radio communication.

A third feature according to the first feature is summarized as that the user-side communication unit transmits inquiry information inquiring whether or not there is the desired product in inventory and the desired product identification information, to the sales terminal by use of the short range radio communication.

A fourth feature according to the third feature is summarized as that the user-side communication unit transmits authentication information indicating that the user is qualified to purchase the desired product, if receiving inventory information indicating that there is the desired product in inventory, to the sales terminal by use of the short range radio communication.

A fifth feature according to the first feature is summarized as that the communication area is a narrow area where proximity communication is performed, and the user-side communication unit transmits the desired product identification information and the authentication information to the sales terminal, when the user terminal enters the narrow area.

A sixth feature according to any one of the first feature and the fifth feature is summarized as that the communication area is a wide area wider than the narrow area where the proximity communication is performed, and the user-side communication unit does not transmit authentication information indicating that the user is qualified to purchase the desired product, but transmits the desired product identification information to the sales terminal, when the user terminal enters the wide area.

A seventh feature according to any one of the first to sixth features is summarized as the sales system comprising: a registration terminal configured to register, into the sales-side memory, the desired product identification information and the desired product position information in an associated manner.

An eighth feature is summarized as a sales terminal arranged at a sales facility having a display cabinet on which products are disposed, comprising: a sales-side memory configured to store product identification information identifying each of the products and product position information indicating a position of each of the products on the display cabinet, in an associated manner; a sales-side communication unit configured to receive, when a user terminal in which a desired product included in the products is previously stored enters a communication area communicable with the sales terminal, desired product identification information from the user terminal by use of the short range radio communication, the desired product identification information being the product identification information identifying the desired product; and a sales-side controller configured to extract, from the memory, desired product position information, based on the desired product identification information, the desired product position information being the product position information indicating a position of the desired product on the display cabinet.

A ninth feature is summarized as a user terminal carried by a user desiring to purchase a desired product included in products from a sales facility having a display cabinet on which the products are disposed, comprising: a user-side memory configured to previously store desired product identification information, the desired product identification information being product identification information identifying the desired product; and a user-side communication unit configured to transmit the desired product identification information previously stored in the user-side memory to a sales terminal arranged at the sales facility by use of a short range radio communication, when the user terminal enters a communication area communicable with the sales terminal.

A tenth feature is summarized as a program used for a user terminal carried by a user desiring to purchase a desired product included in products from a sales facility having a display cabinet on which the products are disposed, the program causes a computer to execute the steps of: (A) reading desired product identification information from a user-side memory provided in the user terminal, the desired product identification information being product identification information identifying the desired product; and (B) transmitting the desired product identification information read in the step (A) to a sales terminal arranged at the sales facility by use of a short range radio communication, when the user terminal enters a communication area communicable with the sales terminal.

DESCRIPTION OF EMBODIMENTS

Hereinafter, embodiments of the present invention will be described. In the following description of the drawings, the same or similar parts are denoted by the same or similar reference numerals. It is noted that the drawings are schematic, and the ratios of dimensions and the like may be different from the actual ones.

Therefore, specific dimensions and the like should be determined by referring to the following description. Of course, the drawings may include the parts with different dimensions and ratios.

Overview of Embodiment

In the above-described over-the-counter sales method, as a trigger to notify the sales terminal of the desired product from the user terminal, a user manipulation for notifying the desired product (designating of the desired product, a button manipulation to trigger the notification of the desired product, or the like) is needed.

However, some products are regarded, by each user, as a semi-fixed desired product (a cigarette, or the like, for example), and for such a product, a user manipulation involving the designation of the desired product is complicated. Further, in a case where a purchase decision for the desired product is clear and a case where a sales management intended to carry out market research for the desired product is performed, a user manipulation to trigger the notification of the desired product is also complicated.

A sales system according to a embodiment comprises: a sales terminal arranged at a sales facility having a display cabinet on which products are disposed; and a user terminal carried by a user desiring to purchase a desired product included in the products. The user terminal comprises: a user-side memory configured to previously store desired product identification information, the desired product identification information being product identification information identifying the desired product; and a user-side communication unit configured to transmit the desired product identification information previously stored in the user-side memory to the sales terminal by use of a short range radio communication, when the user terminal enters a communication area communicable with the sales terminal. The sales terminal comprises: a sales-side communication unit configured to receive the desired product identification information from the user terminal by use of the short range radio communication; a sales-side memory configured to store product identification information identifying each of the products and product position information indicating a position of each of the products on the display cabinet, in an associated manner; and a sales-side controller configured to extract, from the sales-side memory, desired product position information, based on the desired product identification information, the desired product position information being the product position information indicating a position of the desired product on the display cabinet.

In the embodiment, the user terminal transmits the desired product identification information previously stored in the user-side memory to the sales terminal by use of the short range radio communication, when the user terminal enters the communication area communicable with the sales terminal. Therefore, it is possible to notify the desired product while eliminating a need of a user manipulation for notifying the desired product (designation of the desired product, a button manipulation to trigger a notification of the desired product, or the like), and it is possible to improve user convenience.

Embodiment (Sales System)

Figure 1:
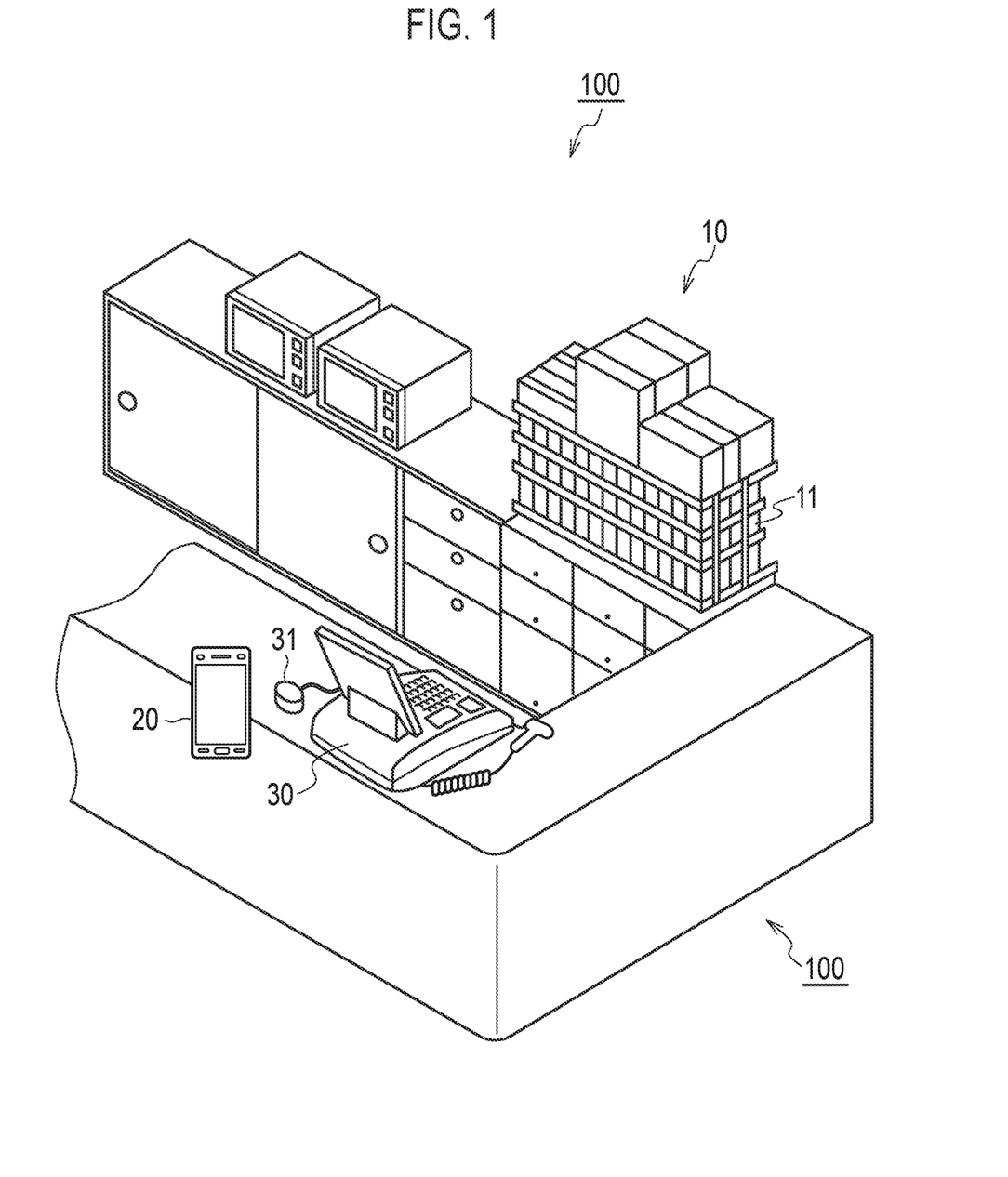
FIG. 1 is a diagram illustrating a sales system 100 according to an embodiment.

A sales system according to an embodiment will be described, below. FIG. 1 is a diagram illustrating a sales system 100 according to the embodiment.

As illustrated in FIG. 1, the sales system 100 includes a user terminal 20 carried by a user desiring to purchase a desired product included in products 11, and a sales terminal 30 arranged at a sales facility 110 having a display cabinet 10 on which the products 11 are disposed. In the embodiment, a case is illustrated where the sales facility 110 is a shop (cash register space) such as a convenience store and a sales outlet.

The display cabinet 10 is arranged in the cash register space, and is a rack or the like to house the products 11. Examples of the products 11, which are not particularly limited, include a tobacco product such as a general cigarette and a product (gum, candy or patch) used in a month, an electronic cigarette, a replaceable atomizer cartridge used for the electronic cigarette, and a replaceable flavor cartridge used for the electronic cigarette.

The user terminal 20 is a terminal having a function of performing short range radio communication. Examples of the user terminal 20, which is not particularly limited, include a smartphone, a tablet, an electronic cigarette, and an electronic cigarette case.

Here, the short range radio communication refers to communication having a communication area of a short range (several centimeters to several tens of meters). For example, the short range radio communication may be proximity communication (non-contact communication) such as RFID (radio frequency identifier) and NFC (Near Field Communication). The proximity communication uses, as the communication area, a narrow area of several centimeters to about 1 meter, for example. The short range radio communication may be communication (such as Bluetooth and WiFi) using, as the communication area, a wide area (up to several tens of meters) wider than the narrow area. Here, description proceeds with an example where the short range radio communication is the proximity communication.

The sales terminal 30 is a terminal having a function of performing the short range radio communication. The sales terminal 30 has a communication unit 31 for performing the proximity communication. As illustrated in FIG. 1, the communication unit 31 may be an external device coupled to a main body of the sales terminal 30. Example of the sales terminal 30, which is not particularly limited, include a cash register and a POS (Point Of Sales) terminal arranged in the cash register space.

(User Terminal)

Figure 2:
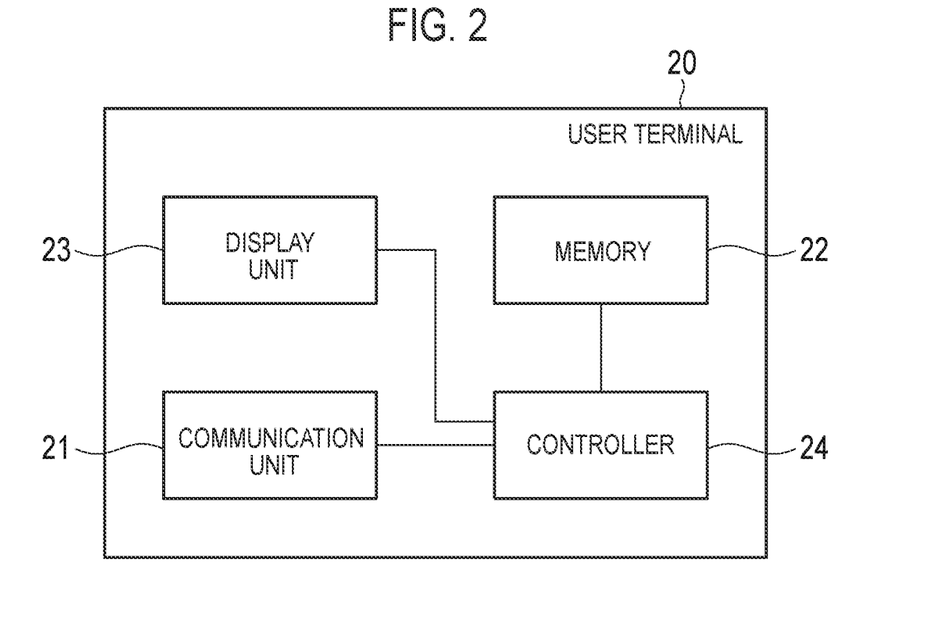
FIG. 2 is a diagram illustrating a user terminal 20 according to the embodiment.

The user terminal 20 according to the embodiment will be described, below. FIG. 2 is a diagram illustrating the user terminal 20 according to the embodiment.

As illustrated in FIG. 2, the user terminal 20 includes a communication unit 21, a memory 22, a display unit 23, and a controller 24.

The communication unit 21 is comprised of a communication module, and performs short range radio communication with the sales terminal 30. In the embodiment, the communication unit 21 transmits desired product identification information previously stored in the memory 22 to the sales terminal 30 by use of the short range radio communication, when the user terminal 20 enters a communication area communicable with the sales terminal 30. The communication area is a narrow area where the proximity communication is performed, as described above.

Here, a timing for the user terminal 20 entering the communication area may be a timing at which a signal strength of a signal (a beacon signal or a synchronization signal) received from the sales terminal 30 exceeds a predetermined threshold value.

In the embodiment, the communication unit 21 may transmit inquiry information inquiring whether or not there is the desired product in inventory and the desired product identification information to the sales terminal 30 by use of the short range radio communication. The inquiry information may be different from the desired product identification information. The inquiry information may be the desired product identification information itself. In such a case, the desired product identification information also has a meaning to inquire whether or not there is the desired product in inventory.

In the embodiment, the communication unit 21 may transmit, to the sales terminal 30 by use of the short range radio communication, authentication information indicating that the user is qualified to purchase the desired product, if receiving inventory information indicating that there is the desired product in inventory. The authentication information is to prove an age of the user, for example.

The memory 22 is comprised of a non-volatile memory such as HDD (Hard Disk Drive) or SSD (Solid State Drive), and stores various types of information such as a program for operating the user terminal 20. In the embodiment, the memory 22 previously stores the desired product identification information, the desired product identification information being product identification information identifying the desired product.

Here, the desired product is a product semifixed according to a user preference. Therefore, it should be noted that the desired product identification information can be previously stored in the memory 22.

The display unit 23 is comprised of a liquid crystal display, an organic EL, a light-emitting element such as LED, and the like, and displays various types of information. For example, the display unit 23 may display information (desired product position information, described later, for example) received from the sales terminal 30. Further, if the display unit 23 is the light-emitting element, the light-emitting element may display, by lighting or blinking, whether or not the communication is normally performed.

The controller 24 is comprised of a volatile memory such as DRAM and SRAM, and CPU or the like, and controls various configurations arranged in the user terminal 20. For example, the controller 24 may instruct the communication unit 21 to transmit the desired product identification information at a timing at which a signal strength of a signal (a beacon signal or a synchronization signal) received from the sales terminal 30 exceeds a predetermined threshold value.

(Sales Terminal)

Figure 3:
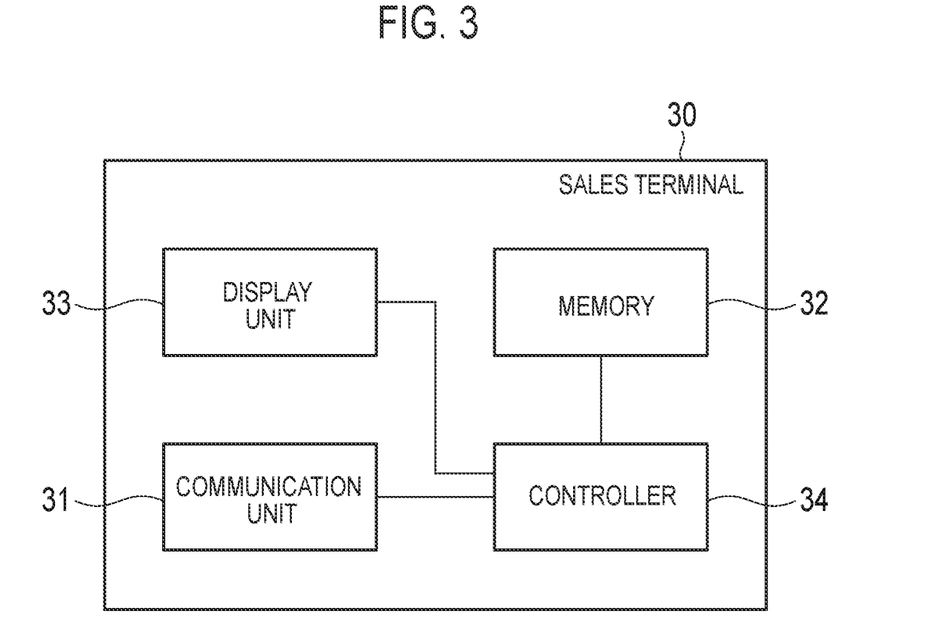
FIG. 3 is a diagram illustrating a sales terminal 30 according to the embodiment.

The sales terminal 30 according to the embodiment will be described, below. FIG. 3 is a diagram illustrating the sales terminal 30 according to the embodiment.

As illustrated in FIG. 3, the sales terminal 30 includes the communication unit 31, a memory 32, a display unit 33, and a controller 34.

The communication unit 31 is comprised of a communication module, and performs short range radio communication with the user terminal 20. In the embodiment, the communication unit 31 receives the desired product identification information previously stored in the user terminal 20 to the sales terminal 30 by use of the short range radio communication, when the user terminal 20 enters a communication area communicable with the sales terminal 30. The communication area is a narrow area where the proximity communication is performed, as described above.

The memory 32 is comprised of a non-volatile memory such as HDD (Hard Disk Drive) or SSD (Solid State Drive), and stores various types of information such as a program for operating the sales terminal 30. In the embodiment, the memory 32 stores the product identification information identifying each of the products 11 and product position information indicating a position of each of the products 11 on the display cabinet, in an associated manner. Here, the memory 32 may store, in addition to the product identification information and the product position information, inventory information on the products 11.

The display unit 33 is comprised of a liquid crystal display, an organic EL, or the like, and displays various types of information. For example, the display unit 33 may display the desired product position information, the desired product position information being the product position information indicating the position of the desired product on the display cabinet. The display unit 33 may display, in addition to the desired product position information, desired product identification information (a brand name, a package design or the like of the desired product, for example).

The controller 34 is comprised of a memory, CPU or the like, and controls each configuration arranged in the sales terminal 30. In the embodiment, the controller 34 extracts, based on the desired product identification information received from the user terminal 20, the desired product position information, the desired product position information being the product position information indicating the position of the desired product on the display cabinet, from the memory 32. The controller 34 may instruct the display unit 33 to display the extracted desired product position information, and may instruct the communication unit 31 to transmit the extracted desired product position information. In such a case, the desired product position information is displayed on the display unit 23 of the user terminal 20.

In the embodiment, the controller 34 may confirm whether or not there is the desired product in inventory, in response to reception of the desired product identification information (inquiry information). The controller 34 may instruct the sales terminal 30 to transmit inventory information indicating whether or not there is the desired product in inventory.

(Sales Method)

Figure 4:
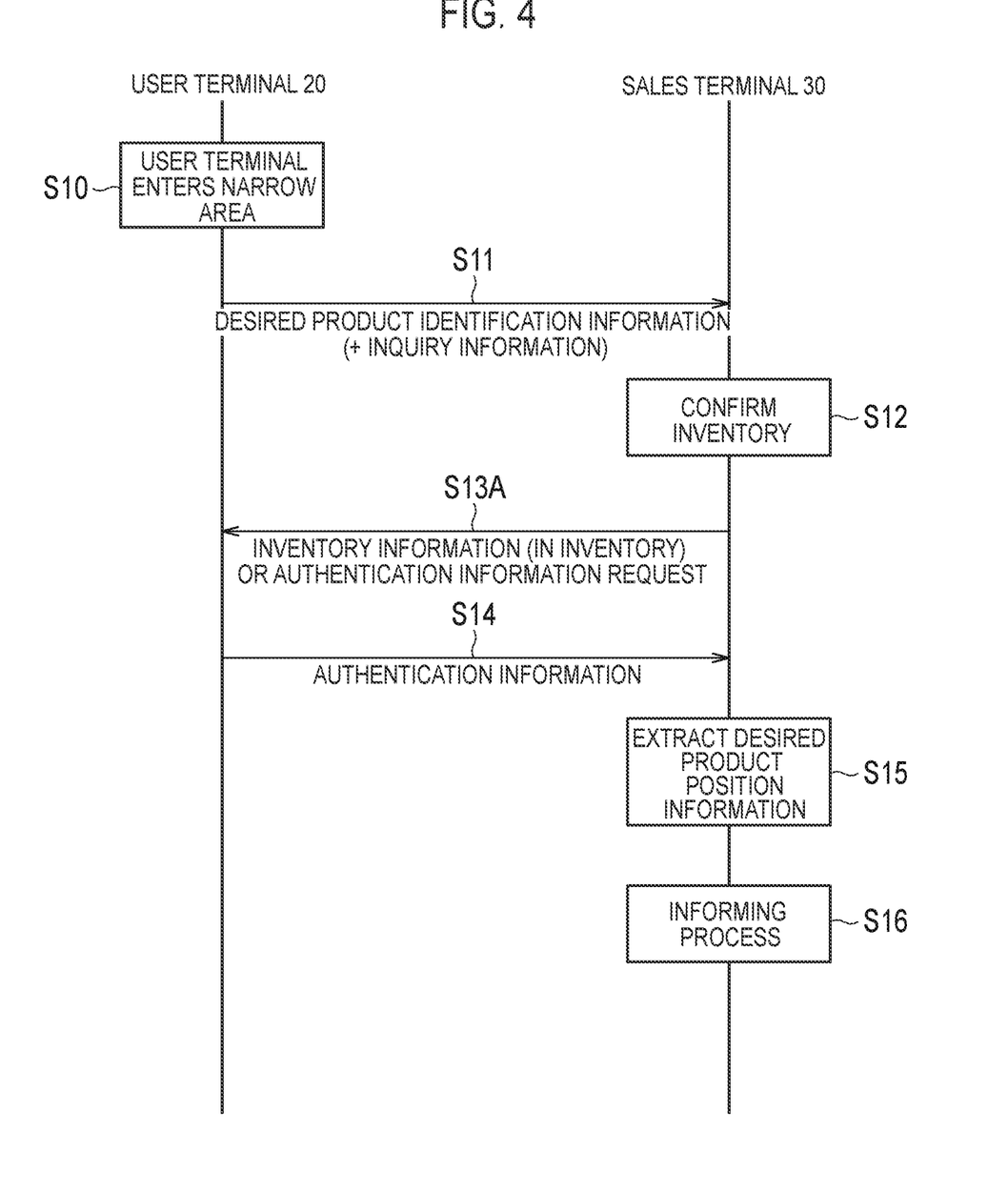
FIG. 4 is a diagram illustrating a sales method according to an embodiment according to the embodiment.
Figure 5:
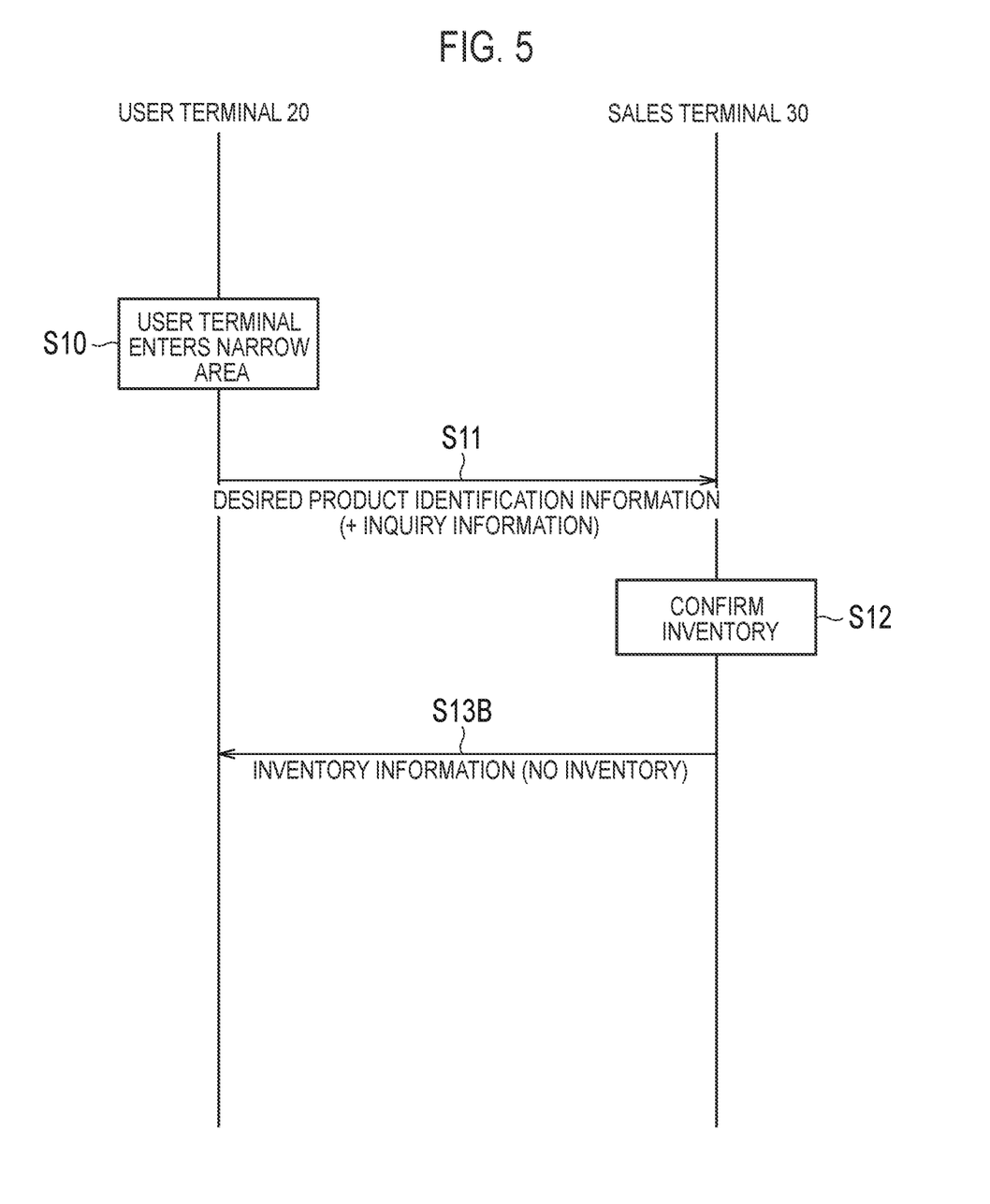
FIG. 5 is a diagram illustrating a sales method according to the embodiment according to the embodiment.

A sales method according to the embodiment will be described, below. FIG. 4 and FIG. 5 are diagrams each illustrating the sales method according to the embodiment.

Firstly, a case of having the desired product in inventory will be described with reference to FIG. 4.

As illustrated in FIG. 4, in step S10, the user terminal 20 enters a communication area (narrow area) communicable with the sales terminal 30. For example, the user terminal 20 detects that the signal strength of a signal (a beacon signal or a synchronization signal) received from the sales terminal 30 exceeds a predetermined threshold value.

In step S11, the user terminal 20 transmits desired product identification information previously stored in the memory 22 to the sales terminal 30 by use of the short range radio communication. The user terminal 20 transmits the desired product identification information and inquiry information inquiring whether or not there is the desired product in inventory. As described above, the inquiry information may be different from the desired product identification information, and may be the desired product identification information itself.

In step S12, the sales terminal 30 confirms whether or not there is the desired product in inventory.

In step S13A, the sales terminal 30 transmits inventory information indicating that there is the desired product in inventory, to the user terminal 20. The sales terminal 30 may transmit the inventory information, and an authentication information request requesting the transmission of the authentication information. The authentication information request may be different from the inventory information. The authentication information request may be the inventory information itself. In such a case, the inventory information indicating that there is the desired product in inventory also has a meaning of requesting the transmission of the authentication information.

In step S14, the user terminal 20 transmits the authentication information indicating that the user is qualified to purchase the desired product to the sales terminal 30 by use of the short range radio communication.

In step S15, the sales terminal 30 extracts from the memory 32 the desired product position information, the desired product position information being the product position information indicating the position of the desired product on the display cabinet.

In step S16, the sales terminal 30 performs a process of informing the desired product position information. The informing process may be a process of causing the display unit 23 of the user terminal 20 to display the desired product position information, or may be a process of causing the display unit 33 of the sales terminal 30 to display the desired product position information. If the display cabinet has a light-emitting element at a position corresponding to each of the products 11, the informing process may be a process of controlling a light emission of the light-emitting element arranged at a position corresponding to the desired product.

Secondly, a case of having no desired product in inventory will be described with reference to FIG. 5. It is noted that in FIG. 5, like step numbers are assigned to processes similar to those in FIG. 4. Here, the processes similar to those in FIG. 4 will not be described.

As illustrated in FIG. 5, in step S13B, the sales terminal 30 transmits inventory information indicating that there is no desired product in inventory, to the user terminal 20. In such a case, the above-described authentication information request is not transmitted to the user terminal 20. Further, a process after the above-described step S14 will be omitted.

It is noted that in step S12, based on the desired product identification information, the sales terminal 30 may extract alternative product identification information identifying an alternative product for the desired product and confirm whether or not there is the alternative product in inventory. If there is the alternative product in inventory, in step S13B, the sales terminal 30 transmits alternative product position information, the alternative product position information being the product position information indicating a position of the alternative product on the display cabinet, to the user terminal 20. The sales terminal 30 may transmit the inventory information indicating that there is no desired product in inventory, and the alternative product position information.

Although not particularly mentioned in the above-described embodiment, the desired product identification information may include identification information identifying each of the desired products having a priority. In such a case, the sales terminal 30 confirms whether or not there is the desired product in inventory in the order of higher priority (step S12 in FIG. 4 or FIG. 5). The sales terminal 30 transmits the desired product position information to the user terminal 20, for the desired product having the highest priority, out of the desired products in inventory (step S13A in FIG. 4). If none of the desired products are in inventory, the sales terminal 30 transmits the inventory information indicating that there is no desired product in inventory, to the user terminal 20 (step S13B in FIG. 5).

(Operation and Effect)

In the embodiment, the user terminal 20 transmits the desired product identification information previously stored in the memory 22 to the sales terminal 30 by use of the short range radio communication, when the user terminal 20 enters the communication area communicable with the sales terminal 30. Therefore, it is possible to notify the desired product while eliminating a need of a user manipulation for notifying the desired product (designating of the desired product, a button manipulation to trigger the notification of the desired product, or the like), and it is possible to improve user convenience.

In the embodiment, the user terminal 20 transmits the authentication information to the sales terminal 30 only if receiving the inventory information indicating that there is the desired product in inventory. Therefore, transmission of unnecessary authentication information is restrained, and it is possible to prevent leakage or the like of the authentication information.

First Modification

A first modification of the embodiment will be described, below. A difference from the embodiment will be described, below.

In the embodiment, the user terminal 20 transmits the authentication information to the sales terminal 30 in response to reception of the inventory information indicating that there is the desired product in inventory. In contrast, in the first modification, the user terminal 20 transmits the desired product identification information and the authentication information, to the sales terminal 30.

(Sales Method)

Figure 6:
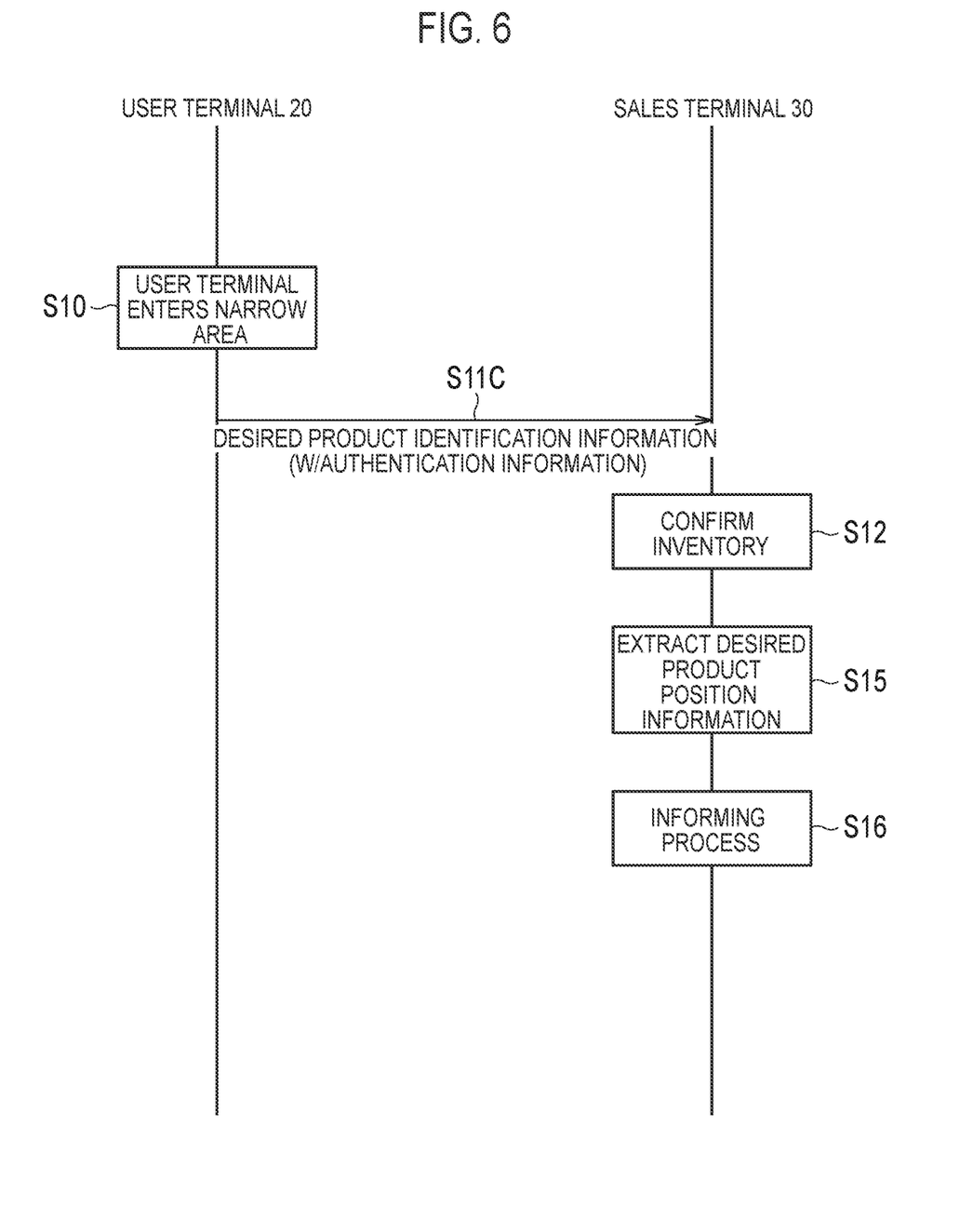
FIG. 6 is a diagram illustrating a sales method according to a first modification of the embodiment.
Figure 7:
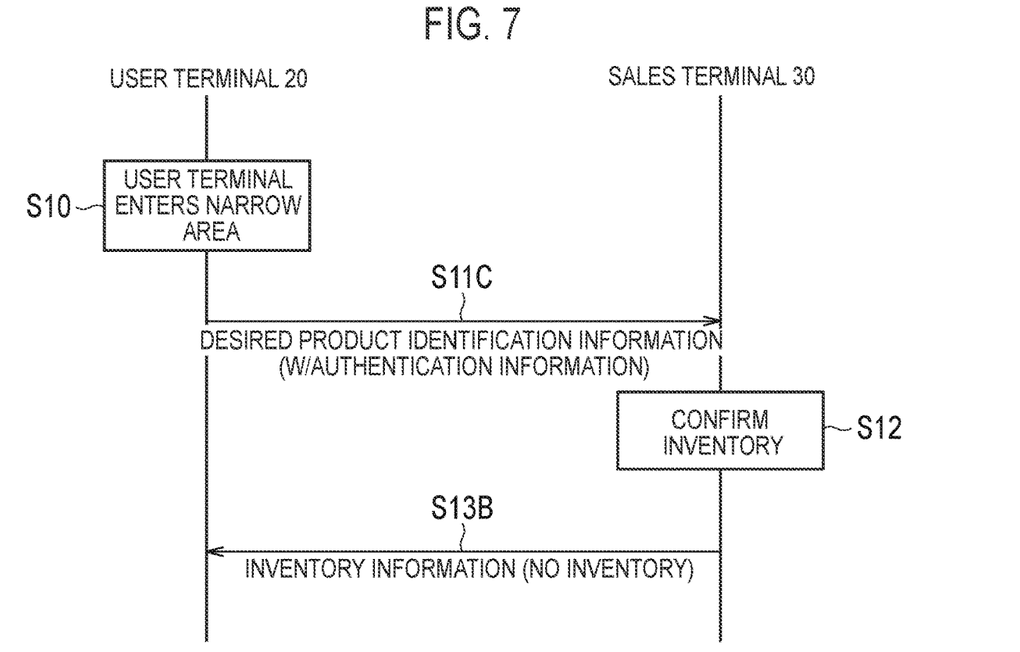
FIG. 7 is a diagram illustrating the sales method according to the first modification of the embodiment.

A sales method according to the first modification will be described, below. FIG. 6 and FIG. 7 are diagrams each illustrating the sales method according to the first modification. It is noted that in FIG. 6 and FIG. 7, like step numbers are assigned to processes similar to those in FIG. 4 and FIG. 5. Here, the processes similar to those in FIG. 4 and FIG. 5 will not be described.

Firstly, a case of having the desired product in inventory will be described with reference to FIG. 6. As illustrated in FIG. 6, in step S11C, the user terminal 20 transmits the desired product identification information and the authentication information, to the sales terminal 30. Here, it should be noted that the user terminal 20 transmits the desired product identification information and the authentication information to the sales terminal 30, triggered by the user terminal 20 having entered the narrow area where the proximity communication is performed. In such a case, the processes of step S13A and step S14 illustrated in FIG. 4 are omitted.

Secondly, a case of having no desired product in inventory will be described with reference to FIG. 7. As illustrated in FIG. 7, in step S11C, the user terminal 20 transmits the desired product identification information and the authentication information to the sales terminal 30, similarly to FIG. 6. In such a case, similarly to FIG. 5, in step S13B, the sales terminal 30 may transmit the inventory information indicating that there is no desired product in inventory, to the user terminal 20. Further, a process after the above-described step S14 will be omitted, similarly to FIG. 5.

(Operation and Effect)

In the first modification, the user terminal 20 transmits the desired product identification information and the authentication information, to the sales terminal 30, only if the communication area is the narrow area. Therefore, it is possible to prevent the leakage or the like of the authentication information and it is also possible to reduce a user's waiting time by reducing a sequence between the user terminal 20 and the sales terminal 30.

Second Modification

A second modification of the embodiment will be described below. A difference from the embodiment will be described, below.

In the embodiment, the communication area communicable with the sales terminal 30 is the narrow area where the proximity communication is performed. On the other hand, in the second modification, the communication area communicable with the sales terminal 30 is a wide area wider than the narrow area. In other words, in the second modification, the short range radio communication is communication (such as Bluetooth and WiFi) using, as the communication area, a wide area (up to several tens of meters) wider than the narrow area. Therefore, in the second modification, it is possible to collect the desired product identification information from the user terminal 20 carried by a user present within the sales facility 110 (shop) or a user passing in front of the sales facility 110 (shop).

(Collection Method)

Figure 8:
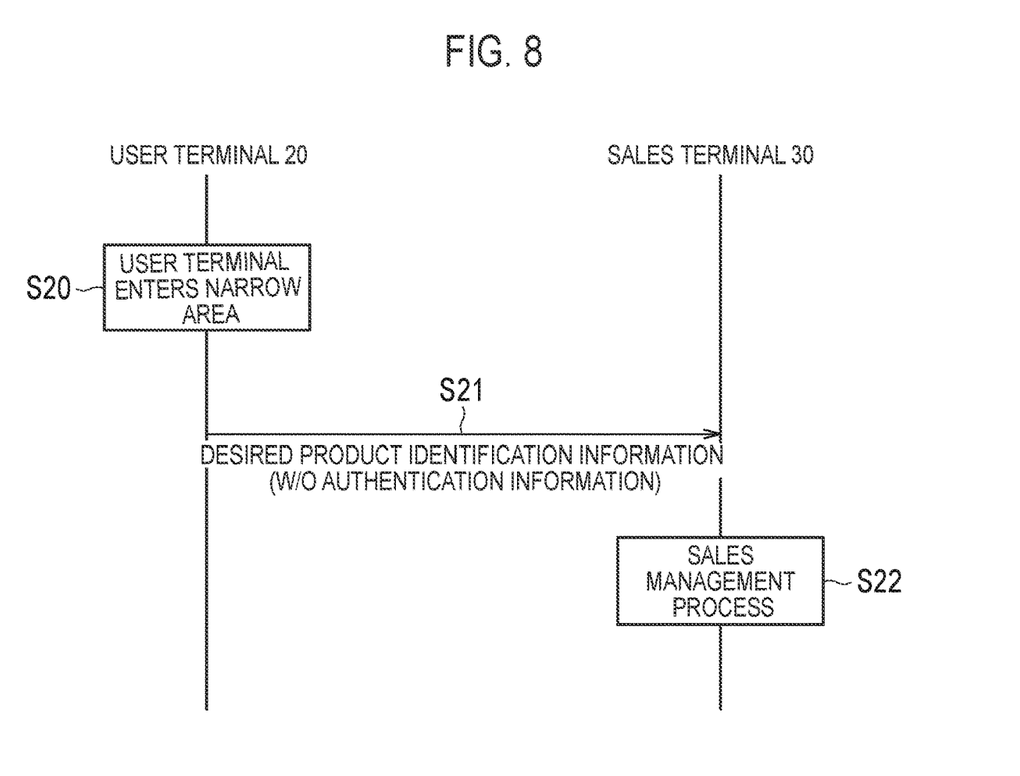
FIG. 8 is a diagram illustrating a collection method according to a second modification of the embodiment.

A collection method according to the second modification will be described, below. FIG. 8 is a diagram illustrating the collection method according to the second modification.

As illustrated in FIG. 8, in step S20, the user terminal 20 enters the communication area (wide area) communicable with the sales terminal 30. For example, the user terminal 20 detects that the signal strength of a signal (a beacon signal or a synchronization signal) received from the sales terminal 30 exceeds a predetermined threshold value.

In step S21, the user terminal 20 does not transmit the authentication information, but transmits the desired product identification information previously stored in the memory 22 to the sales terminal 30 by use of the short range radio communication.

In step S22, the sales terminal 30 performs a sales management process, based on the desired product identification information. The sales management process may be a process of transmitting the desired product identification information to a management server, for example. The management server may optimize, based on the desired product identification information, a consumer trend of a user purchasing the products 11, an inventory prediction of the products 11, a cabinet position of the products 11 at the sales facility 110.

Here, needless to say, the second modification may be combined with the embodiment or the first modification. Specifically, the user terminal 20 transmits the inquiry information or the authentication information and the desired product identification information previously stored in the memory 22 to the sales terminal 30 by use of the short range radio communication, when the user terminal 20 enters the narrow area. The sales terminal 30 extracts, based on the desired product identification information, the desired product position information from the memory 32 (the embodiment or the first modification). On the other hand, the user terminal 20 does not transmit the inquiry information and the authentication information, but transmits the desired product identification information previously stored in the memory 22 to the sales terminal 30 by use of the short range radio communication, when the user terminal 20 enters the wide area. The sales terminal 30 performs the sales management process, based on the desired product identification information (second modification). It is noted that the sales terminal 30 can determine, based on a category of a communication module by which the desired product identification information is received, whether the communication area is the narrow area or the wide area.

(Operation and Effect)

In the second modification, the user terminal 20 does not transmit the authentication information, but transmits the desired product identification information to the sales terminal 30, if the communication area is the wide area. Therefore, it is possible to prevent the leakage or the like of the authentication information and it is also possible to notify the sales terminal 30 of the desired product identification information useful for the sales management.

Third Modification

A third modification of the embodiment will be described, below. A difference from the embodiment will be described, below.

In the embodiment, the sales facility 110 is a shop. In contrast, in the third modification, the sales facility 110 is an automatic vending machine. In such a case, the user terminal 20 may be a purchase card for purchasing the products 11. The purchase card may be distributed to a user who is authenticated to be qualified to purchase the desired product. The purchase card may be compatible with a pre-paid function and a credit function, and may also be used for a settlement of a payment of the products 11.

Figure 9:
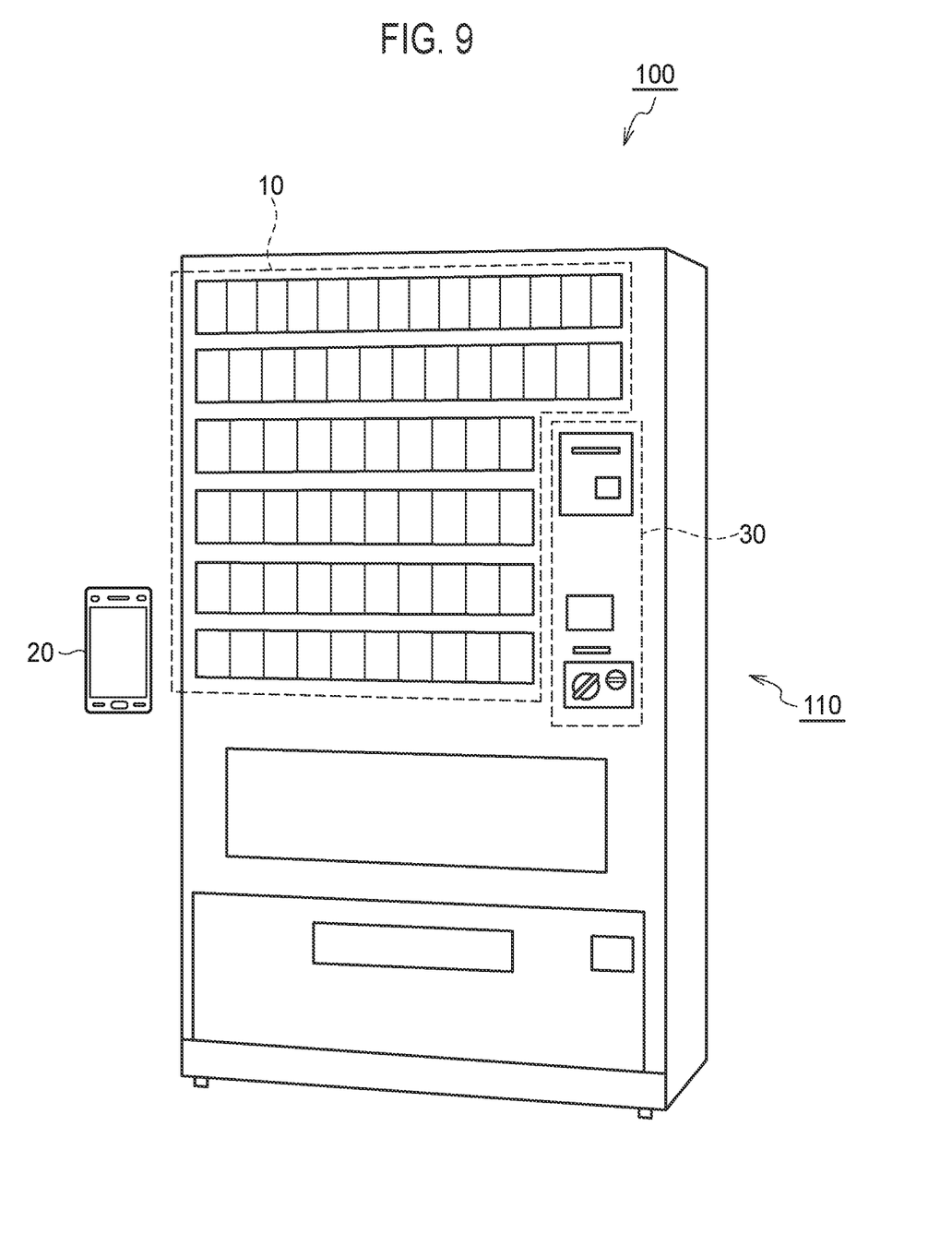
FIG. 9 is a diagram illustrating the sales system 100 according to a third modification.

Even if the sales facility 110 is the automatic vending machine, as illustrated in FIG. 9, the sales system 100 includes the user terminal 20 carried by a user desiring to purchase a desired product included in the products 11, and the sales terminal 30 arranged in the sales facility 110 having the display cabinet 10 on which the products 11 are disposed. In such a case, the sales terminal 30 is contained in the automatic vending machine. Therefore, even if the sales facility 110 is the automatic vending machine, it is possible to obtain a similar effect to that in the embodiment and the first modification to the third modification.

For example, in a case where the user terminal 20 is a purchase card, a user only places the purchase card over the automatic vending machine to cause the desired product position information to be displayed by way of lighting or blinking of the light-emitting element contained in a purchase button of the automatic vending machine. This improves the user convenience.

Other Embodiments

The present invention has been described in terms of the embodiments set forth above; however, the invention should not be understood to be limited by the statements and the drawings constituting a part of this disclosure. From this disclosure, various alternative embodiments, examples, and operational technologies will become apparent to those skilled in the art.

Although not particularly mentioned in the embodiment, the sales system 100 may include a registration terminal configured to register, into the memory 32, the desired product position information and the desired product identification information in an associated manner. The registration terminal may suffice to be capable of connecting with the sales terminal 30 wirelessly or by radio, and preferably includes a user interface for registering the desired product position information and the desired product identification information in an associated manner. The registration terminal may be a desktop or laptop personal computer, a tablet, a smartphone, or a dedicated terminal, for example. The product position information differs depending upon each sales facility 110, and a task of a sales agent is alleviated when the sales system 100 includes the registration terminal.

Although not particularly mentioned in the embodiment, in a case where the communication area is the narrow area (RFID, NFS or the like), the sales terminal 30 may transmit a signal (a beacon signal or a synchronization signal) for detecting that the user terminal 20 enters the narrow area, only if a predetermined condition is satisfied. The predetermined condition may be, for example, that a shop clerk manipulates the sales terminal 30, if there is a user at a cash register space. Alternatively, the predetermined condition may be the automatic vending machine detecting that there is a user in front of the automatic vending machine.

Although not particularly mentioned in the embodiment, in a case where the communication area is the wide area (such as Bluetooth and WiFi), the sales terminal 30 may transmit a signal (a beacon signal or a synchronization signal) for detecting that the user terminal 20 enters the wide area, irrespective of whether or not the above-described predetermined condition is satisfied.

Although not particularly mentioned in the embodiment, the desired product identification information previously stored in the memory 22 may be information read by a barcode reader or the like from a barcode or the like printed on a package of the products 11.

Although not particularly mentioned in the embodiment, the user terminal 20 may be compatible with a pre-paid function and a credit function, and may also be used for a settlement of a payment of the products 11.

Although not particularly mentioned in the embodiments, a program may be provided for causing a computer to execute each process performed by the user terminal 20. Further, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a CD-ROM and a DVD-ROM, for example.

Alternatively, a chip may be provided, which includes a memory for storing the program for performing each process executed by the user terminal 20, and a processor for executing the program stored in the memory.

INDUSTRIAL APPLICABILITY

According to the embodiment, it is possible to provide a sales system, a sales terminal, a user terminal, and a program allowing for notification of a desired product while eliminating a need of a complicated user manipulation.

The invention claimed is:

1. A sales system comprising:
    a sales terminal arranged at a sales facility having a display cabinet on which products are disposed; and
    a user terminal carried by a user desiring to purchase a desired product included in the products, wherein the user terminal comprises:
        a user-side memory configured to previously store desired product identification information, the desired product identification information being product identification information identifying the desired product; and
        a user-side communication unit configured to transmit the desired product identification information previously stored in the user-side memory to the sales terminal by use of a short range radio communication in response to the user terminal entering into a communication area communicable with the sales terminal and before the desired product is removed from the display cabinet,
    wherein the sales terminal comprises:
        a sales-side communication unit configured to receive the desired product identification information from the user terminal by use of the short range radio communication;
        a sales-side memory configured to store product identification information identifying each of the products and product position information indicating a position of each of the products on the display cabinet, in an associated manner; and a sales-side controller configured to extract, from the sales-side memory, desired product position information in response to receiving the desired product identification information from the user terminal and based on the desired product identification information, the desired product position information being the product position information indicating a position of the desired product on the display cabinet, the sales-side controller further configured to cause the desired product position information to be displayed on the sales terminal.

2. The sales system according to claim 1, wherein the user-side communication unit transmits authentication information indicating that the user is qualified to purchase the desired product and the desired product identification information, to the sales terminal by use of the short range radio communication.

3. The sales system according to claim 1, wherein the user-side communication unit transmits the desired product identification information and inquiry information inquiring whether or not there is the desired product in inventory to the sales terminal by use of the short range radio communication.

4. The sales system according to claim 3, wherein the user-side communication unit transmits authentication information indicating that the user is qualified to purchase the desired product, if receiving inventory information indicating that there is the desired product in inventory, to the sales terminal by use of the short range radio communication.

5. The sales system according to claim 1, wherein the communication area is a narrow area where proximity communication is performed, and the user-side communication unit transmits the desired product identification information and the authentication information to the sales terminal, when the user terminal enters the narrow area.

6. The sales system according to claim 1, wherein the communication area is a wide area wider than the narrow area where proximity communication is performed, and the user-side communication unit does not transmit authentication information indicating that the user is qualified to purchase the desired product, but transmits the desired product identification information to the sales terminal, when the user terminal enters the wide area.

7. The sales system according to claim 1, comprising:

a registration terminal configured to register, into the sales-side memory, the desired product identification information and the desired product position information in an associated manner.

8. A sales terminal arranged at a sales facility having a display cabinet on which products are disposed, comprising:

a sales-side memory configured to store product identification information identifying each of the products and product position information indicating a position of each of the products on the display cabinet, in an associated manner;

a sales-side communication unit configured to receive desired product identification information from a user terminal by use of the short range radio communication in response to the user terminal entering into a communication area communicable with the sales terminal and before a desired product included in the products is removed from the display cabinet, the user terminal previously storing the desired product identification information identifying the desired product; and a sales-side controller configured to extract, from the sales-side memory, desired product position information in response to receiving the desired product identification information from the user terminal and based on the desired product identification information, the desired product position information being the product position information indicating a position of the desired product on the display cabinet, the sales-side controller further configured to cause the desired product position information to be displayed on the sales terminal.

\* \* \* \* \*